April 19, 1966 W. E. KEMP 3,246,805
HOPPER STRUCTURE

Filed June 29, 1964 5 Sheets-Sheet 1

INVENTOR.
WILLARD E. KEMP
BY
AGENT

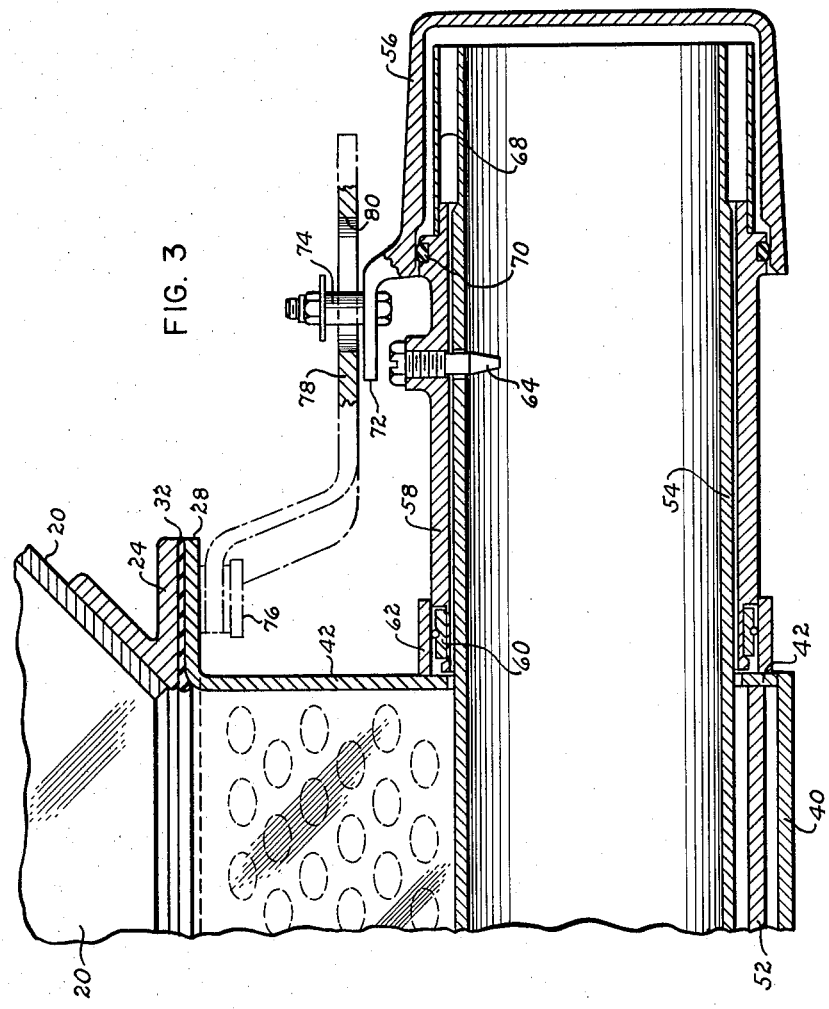

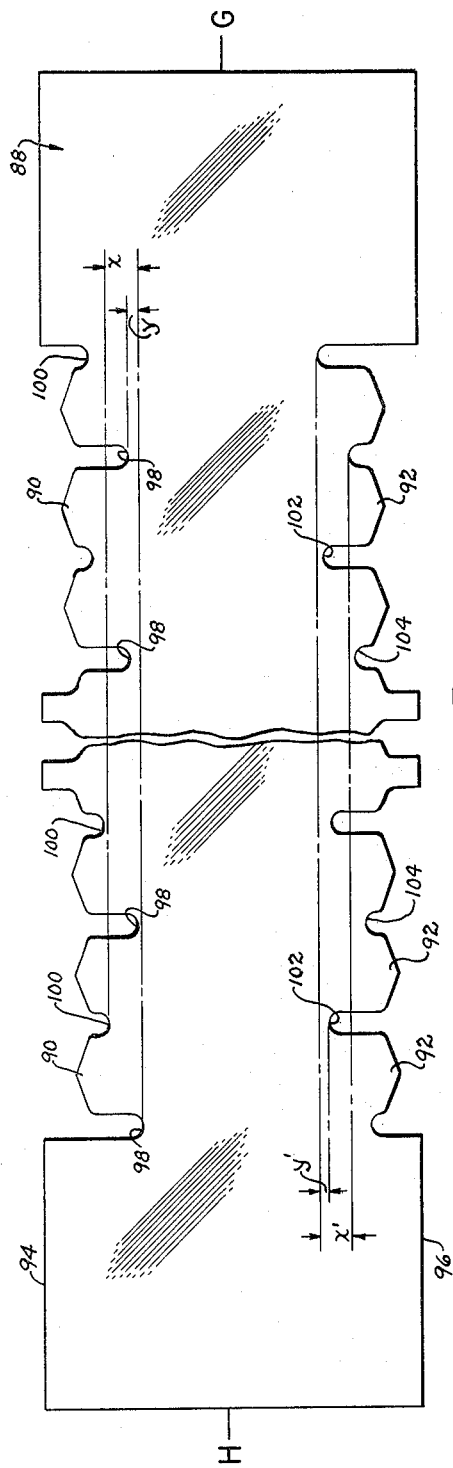
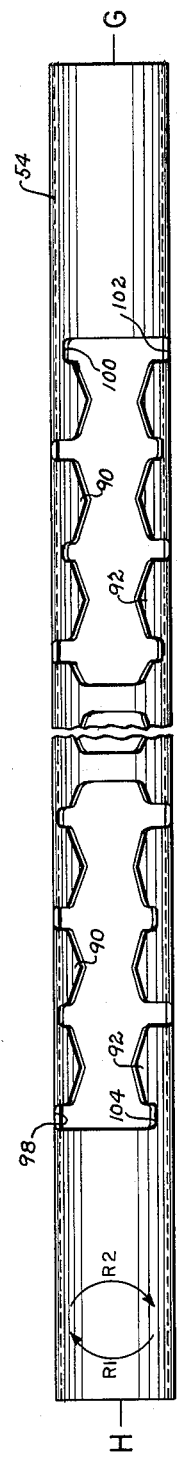

United States Patent Office 3,246,805
Patented Apr. 19, 1966

1

3,246,805
HOPPER STRUCTURE
Willard E. Kemp, Bridgeton, Mo., assignor to ACF Industries, Incorporated, New York, N.Y., a corporation of New York
Filed June 29, 1964, Ser. No. 378,548
8 Claims. (Cl. 222—195)

This invention relates to apparatus for unloading finely-divided materials from the bottom of hopper structures and the like, such as a railway hopper car, and more particularly to an outlet structure beneath the hopper structure for pneumatically discharging material from the hopper structure.

Heretofore, in the pneumatic discharge of finely-divided materials, such as granular and pulverulent materials, from a hopper structure, an outlet structure has been attached beneath the discharge opening of a hopper structure to receive the material from the hopper structure. A metering valve is normally positioned over an air conduit or passageway at the bottom of the outlet structure to control the flow of material into the passageway for pneumatic discharge. The material to be unloaded moves downwardly along inclined opposite sides of the outlet structure into the opening formed between the spaced lower marginal portions of the sides. In some instances, the material tends to bridge over the lower opening formed between the spaced lower marginal portions of inclined opposite sides of the outlet structure, particularly with fine powdered or pulverulent materials, such as kaolin clay or powdered melamine plastic resin. Such fine pulverulent materials tend to compact and have a high compacted strength which makes the materials difficult to unload. Since the material often tends to compact adjacent the opening it is desirable to assist the movement or flow of material adjacent the opening to the air conduit for pneumatically removing the material.

It is an object of the present invention to provide an outlet structure for unloading finely-divided materials from the bottom of a hopper in which material moving along oppositely inclined sides of the outlet structure into a pneumatic conduit is aerated to assist the movement of the material into the conduit for pneumatic unloading.

Another object is to provide an attachment for an existing pneumatic outlet structure which assists in the unloading of particles from a pneumatic discharge conduit.

A further object of the invention is to provide apparatus for unloading pulverulent material from an elongate pneumatic conduit in which the material adjacent the pneumatic conduit is fluidized to aid the unloading of the material and to prevent bridging over or obstructing the conduit.

An additional object is to provide apparatus for pneumatically unloading finely-divided particles from an outlet structure beneath a hopper structure in which a uniform feeding of particles into a pneumatic discharge conduit is provided to permit an effective pneumatic conveying of the particles from the conduit.

Briefly described, the present invention comprises a bottom outlet structure adapted to be positioned beneath a hopper structure and having a pair of oppositely facing inclined sides with spaced lower marginal portions, and an elongate trough-shaped conduit extending between the lower marginal portions, and an elongate metering valve covering the conduit between the spaced marginal portions to control the flow of material into the conduit, the metering valve being movable toward and away from the adjacent sides to define an opening or slit through which the material flows into the conduit, each of the sides being a permeable member closely adjacent the metering valve and forming at least a portion of a wall of a plenum chamber whereby

2 air from the plenum chamber penetrates the material on the sides to aerate the material generally along the length of the metering valve closely adjacent the metering valve. By having the permeable sides closely adjacent the pneumatic discharge conduit, the particles immediately adjacent the conduit are fluidized and a uniform feeding of particles into the conduit is provided. This allows the particles to be conveyed in a very effective manner at a maximum rate of discharge.

The invention accordingly comprises the constructions hereinafter described, the scope of the invention being indicated in the following claims.

In the accompanying drawings, in which one of various possible embodiments of the invention is illustrated, FIGURE 1 is an elevation of a covered hopper railway car illustrated in a plurality of hopper structures each adapted to contain pulverulent or granular materials to be unloaded pneumatically from an outlet structure secured to the bottom of each hopper structure;

FIGURE 3 is a partial longitudinal section of the outlet structure shown in FIGURE 2 taken from an end of the outlet structure and showing the mounting of the metering valve adjacent the end of the outlet structure;

FIGURE 6 is an elevation of the metering valve or tube of FIGURES 2–5 and showing a tapering slot arrangement;

FIGURE 7 is a top plan of a blank from which the metering tube shown in FIGURE 6 is formed;

Corresponding reference characters indicate corresponding parts throughout the several views of the drawings.

Figure 1:
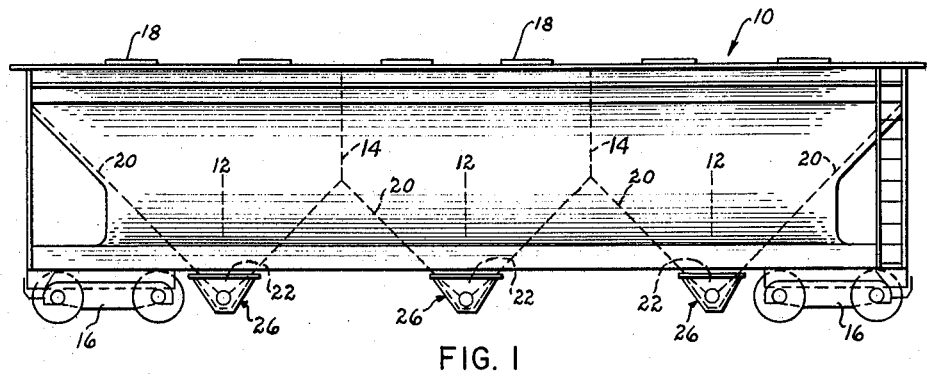
Figure 4:
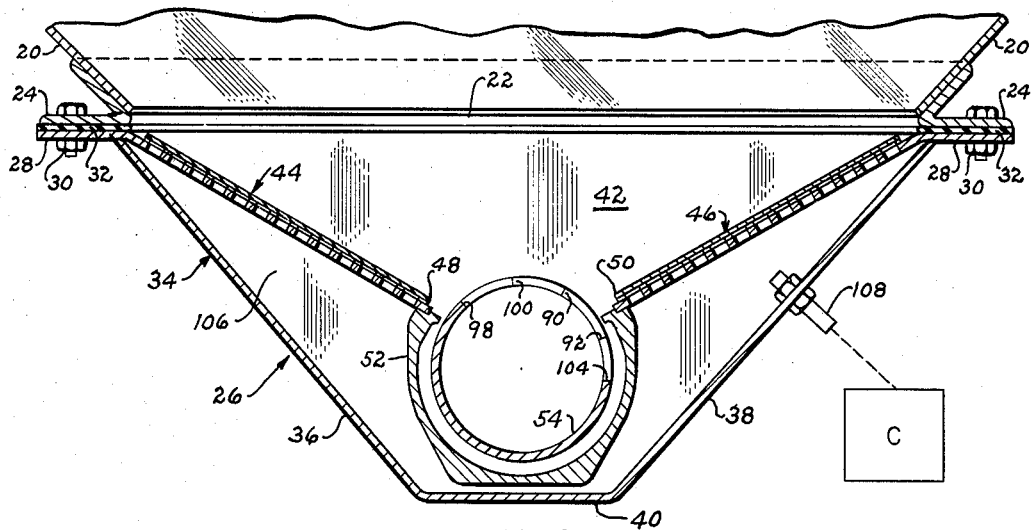
FIGURE 4 is a transverse section of the outlet structure of FIGURE 2 taken generally along line 4—4 of FIGURE 2.

Referring to FIGURE 1 of the drawings, a covered railway hopper car is generally designated 10 and has a plurality of hopper structures 12 separated by partitions or bulkheads 14. A truck assembly 16 is arranged at each end of car 10. Spaced along the top of car 10 are hatch covers 18 for loading of the car with pulverulent, granular, crushed or finely-divided materials, such as, for example, plastic pellets, corn, pebbled lime, and granulated potash. Hopper sheets of each hopper structure 12 slope downwardly to a bottom opening 22. A peripheral outer flange 24 extends about each opening 22 as shown in FIGURE 4.

Figure 2:
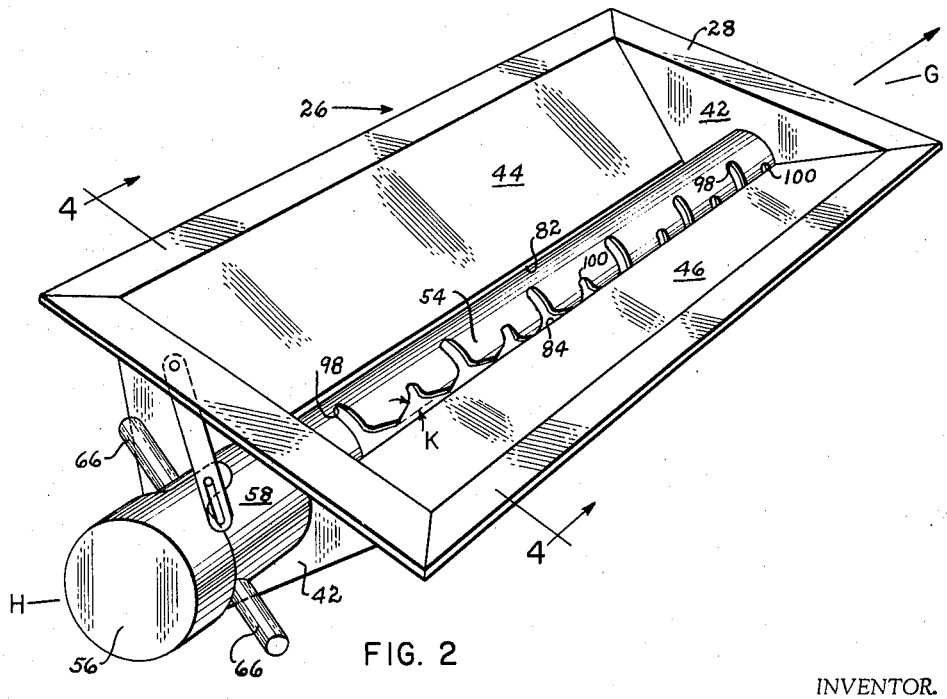
FIGURE 2 is a perspective of one of the outlet structures of FIGURE 1 removed from the hopper car and illustrating the position of the metering valve in one position.

Mounted beneath each hopper structure 12 is an outlet structure generally designated 26 for pneumatically unloading material from car 10. As shown in FIGURE 2, each outlet structure 26 has a generally rectangular upper outer peripheral flange 28 adapted to fit against flange 24. Flange 28 may be secured, such as by suitable nut and bolt combinations 30. A suitable gasket 32 may be positioned between flanges 24 and 28, if desired.

Outlet structure 26 includes an outer housing 34 having oppositely facing sloping side walls 36 and 38 integrally connected by a generally horizontal bottom 40. Housing 34 may be secured, such as by welding, along flange 28 as shown in FIGURE 4. End walls 42 extend vertically between side walls 36 and 38 to form a trough-shaped outlet structure 26.

Mounting within outer housing 34 are inner side walls 44 and 46 inclined downwardly and having spaced respective marginal portions 48 and 50 at their lower ends. Extending between and connecting marginal portions 48 and 50 at their lower end as shown in FIGURE 4 is a generally U-shaped housing generally designated 52 forming a channel or furrowed bottom for outlet structure 26.

Material to be discharged moves downwardly along inner side walls 44 and 46. To discharge the material pneumatically, a metering valve or tube generally designated 54 fits within U-shaped housing 52 between lower marginal portions 48 and 50. Tube 54 has a slot arrangement permitting material to flow within the tube and to be removed pneumatically. An end cap 56 is positioned over each end of tube 54 as shown in FIGURE 3 and material may be unloaded from either end of tube 54. End caps 56 are normally removed when the material is unloaded, one end of tube 54 being connected to a suitable suction hose (not shown) for conveying the material to a suitable storage facility, and the other opposite end drawing air in tube 54.

Referring particularly to FIGURE 3, each end of metering valve 54 fits within an outer sleeve 58. Secured to the inner end of each sleeve 58 is an inner bearing ring 60 supported within an outer bearing ring 62 which, in turn, is secured to the adjacent end wall 42. A set screw 64 holds valve 54 and sleeve 58 together for rotation. Extending outwardly from sleeve 58 are handles 66 which may be gripped to rotate tube 54 and sleeve 58 (see FIGURE 2). An outer tubular extension 68 is fitted about the outer end of sleeve 58 and is adapted for connection to a vacuum hose or the like (not shown) for pneumatically unloading material from outlet structure 26.

An end cap 56 fits over each end of tube 54 and mounted on the adjacent sleeve 58. An O-ring 70 is provided between end cap 56 and sleeve 58 to provide a seal. A support 72 on end cap 56 carries a bolt 74. Pivoted at 76 to flange 28 of outlet structure 26 is a generally Z-shaped bar 78 which is slotted at 80 to receive bolt 74 to permit movement of cap 56 axially of tube 54 for assembly and disassembly. End cap 56 may be removed upon outward longitudinal movement axially of tube 54 with bolt 74 moving relative to the slotted bar 78. Cap 56 may be swung away from valve 54 about pivot 76 after being removed from the end of extension 68.

Outlet structures 26 are often four or five feet in length which sometimes present difficulties in initially rotating the valve from a closed position where a slot arrangement is provided between marginal portions 48 and 50 for discharge of the lading. One reason for a high rotational force being required for turning metering valve 54 is the binding of particles between the valve and the adjacent inner walls 44 and 46 as the valve is closed after being opened. The edge defining the slot arrangement between inner side walls 44 and 46 and metering valve 54 shears the particles caught at a slot and this requires increased turning torque.

Figure 5:
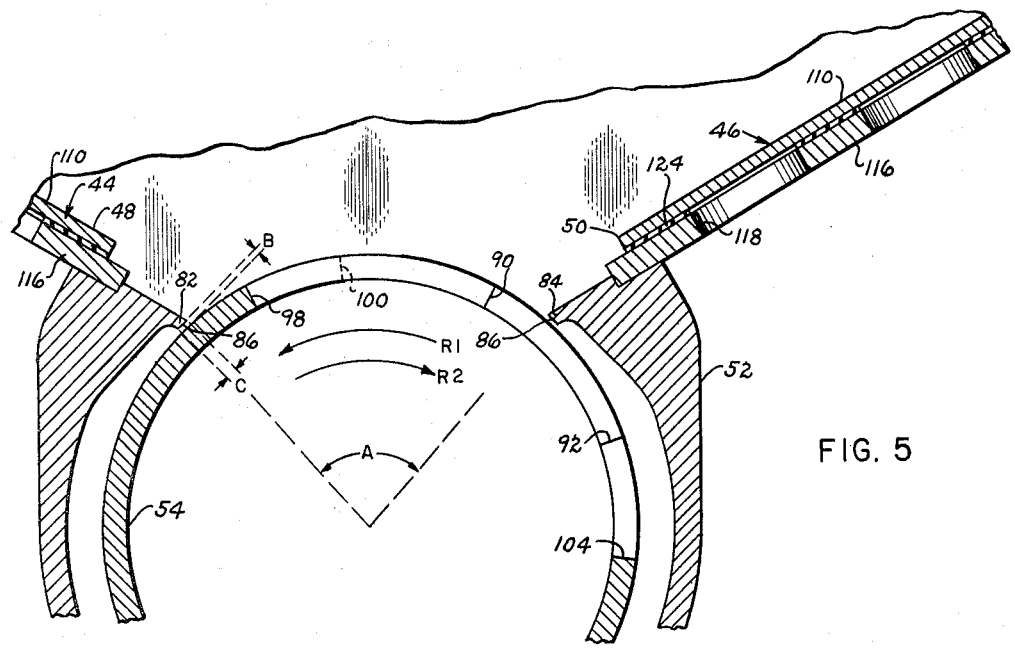
FIGURE 5 is an enlarged fragment of FIGURE 4 showing the upper portion of the metering tube and the adjacent housing structure with the metering valve in the position illustrated in FIGURE 2.

Referring particularly to FIGURE 5, side walls 44 and 46 form junctures with housing 52 terminating in respective lips 82 and 84 adjacent metering valve 54. As indicated by angle A in FIGURE 5, only about 80° of the circumference of valve 54 is exposed to lading within outlet structure 26. To prevent binding of metering valve 54 as it is being rotated, sufficient dimensions should be provided for lips 82 and 84 dependent on the particle size of the material being unloaded. If pulverulent or powdered material of a maximum dimension below 0.010 inch is being unloaded, lips 82 and 84 may be of any suitable dimensions. However, in the event granular or pulverulent material of a maximum dimension over 0.050 inch is being unloaded, then the dimensions of lips 82 and 84 should be sufficient to form a sealing edge and to prevent the lading from passing between lips 82, 84 and the outer circumferential surface of valve 54. For granular or pulverulent material having a minimum particle dimension between about 0.050 inch and 0.250 inch, the distance between lips 82 and 84 and the circumferential surface of valve 54 indicated at B is less than the minimum dimension of the particles and between about $\frac{1}{64}$ and $\frac{1}{8}$ inch. For instance, if the minimum particle dimension is around 0.050 inch, then distance B should be slightly less than $\frac{1}{32}$ inch. Inner surfaces 86 of lips 82 and 84 extend generally coaxially to the adjacent surface of metering valve 54 and is of a width indicated at C between about $\frac{1}{32}$ inch and $\frac{1}{8}$ inch for particles having a minimum dimension between about 0.050 inch and 0.250 inch. It is necessary that lips 82, 84 hold to the minimum a flow of particles in tube 54 when the tube is closed. If the clearance B between lips 82, 84 and the valve 54 were approximately equal to the particle size then the particles would tend to move into the area beneath lips 82, 84 and be carried between the lips when the valve is rotated thereby causing binding of the valve. Since some particles in all pulverulent materials are very fine, there would be some particles that would pass lips 82, 84 but the amount would be at a minimum.

Housing 52 is cut back adjacent lips 82 and 84 at least about $\frac{3}{32}$ inch from the adjacent surface of metering valve 54 and generally around two to five times as great as dimension B. If the clearance between valve 54 and housing 52 is about the same as the particle size or smaller, the particles will be dragged when valve 54 is rotated and will pack tightly between the valve and the inner surface of housing 52 to cause a relatively high friction.

To minimize the length of metering valve 54 exposed to the slotted area at any one time, a slotted arrangement extending longitudinally of the valve is defined by oppositely facing irregular surfaces as illustrated in FIGURES 2, 6 and 7. Metering valve 54 presents an open slot area to the lading adjacent lips 82 and 84 which increases in length as tube 54 is rotated from a closed position to an open position to meter the lading along the length of the tube. Blank 88 from which tube 54 is formed has teeth 90 and 92 which project progressively at different lengths from respective edges 94 and 96. Teeth 90 are separated by alternate long notches 98 and intervening short notches 100. Long notches 102 and intervening short notches 104 separate teeth 92. For example, tube 54 may be of a length of five feet with slot 98 adjacent end H offset ½ inch with respect to slot 98 adjacent end G as measured at Y in FIGURE 7. Long slot 98 adjacent end H is offset 1⅝ inches with respect to short slot 100 adjacent end H as measured at X in FIGURE 7. Corresponding distances for slots 102 and 104 are indicated at X' and Y' on FIGURE 7.

Since the offset between long notch 98 adjacent end H and short notch 100 adjacent end H is 1⅝ inches, all long notches 98 adjacent lip 84 are opened at least 1⅛ inches when rotated in direction R1 before the opening of any of short notches 100, notches 98 being opened progressively farther from end G to end H. When tube 54 is rotated in direction R2 all long notches 102 adjacent lip 82 are opened 1⅛ inches before the opening of any short notches 104, notches 102 being opened progressively farther from end H to end G. This arrangement of the teeth or notches provides a very effective unloading of outlet structure 26 in a minimum of time.

A dentate slot arrangement provides an effective control over the unloading of the lading as a generally uniform unloading pattern along the entire length of the metering valve may be obtained. To decrease any shearing action of the particles between valve 54 and lips 82, 84, it is desirable to have the projecting tips of teeths 90 and 92 formed by converging surfaces which are slanted at an angle of around 20° with respect to the longitudinal axis of valve 54 as indicated at K in FIGURE 2. Particles which are caught between the teeth and lips 82, 84 will tend to be cammed by the surface of the teeth to one side.

Some materials, especially fine powdered or pulverulent materials, such as kaolin clay or powdered melamine plastic resin, tend to bridge across valve 54 between lips 82 and 84 thereby to obstruct the pneumatic discharge of material from metering tube 54. To prevent the bridging over and the compaction of particles adjacent tube 54, means are provided to aerate or fluidize the particles adjacent tube 54 which constitute an important feature of this invention. The fluidizing of the particles above metering valve 54 also reduces the frictional contact between the particles and the valve permitting the valve to rotate easily with a minimum of friction.

To accomplish the foregoing, a plenum chamber 106 is formed between outer housing 34 and inner sides 44 and 46 as shown in FIGURE 4. Air under pressure is supplied to plenum chamber 106 through air conduit 108 from a suitable source of air, such as an air compressor indicated at C. Inner side walls 44 and 46 are fluid permeable to permit gas from plenum chamber 106 to pass into the material above side walls 44 and 46 of the plenum chamber. The permeable side walls 44 and 46 are spaced a maximum distance from metering valve 54 not substantially exceeding around four inches. For best results, the permeable side walls 44 and 46 are spaced between one and two inches from metering valve 54.

Figure 9:
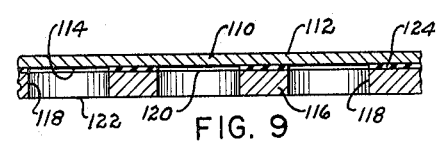
FIGURE 9 is a sectional view taken generally along line 9—9 of FIGURE 8.
Figure 8:
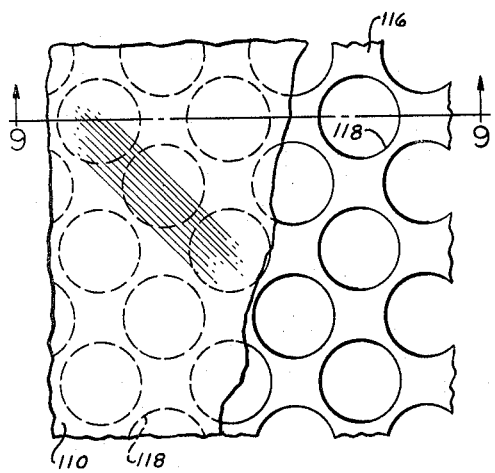
FIGURE 8 is a partial top plan of a permeable wall structure forming an inner side of the outlet structure along which the particles to be discharged move, a portion of the permeable sheet of the wall structure being broken away.

Each side wall 44 and 46 is substantially identical in composition and comprises an upper permeable sheet 110 having generally parallel faces 112 and 114 as illustrated in FIGURES 8 and 9. Upper face 112 forms a material supporting surface, the material to be discharged being supported on face 112 and moving therealong to metering valve 54. Sheet 110 may be formed of any suitable permeable material, such as, for example, a fiber metal material in which metallic fibers, such as stainless steel fibers, have a length to diameter ratio of at least 10 to 1, and as high as 2,000 to 1. The steel fibers are individually dispersed and felted to form a random, interlocked nonwoven body. The nonwoven body is then sintered under reducing condition at a high temperature to produce welds or metallic diffusion bonds at interfiber contact points. Such a material is shown and disclosed in Patent No. 3,127,668 issued April 7, 1964, the entire disclosure of which is incorporated by this reference.

The porosity of a porous medium is expressed as a percent of the void volume of porous space to the total volume of the medium. Sheet 110 may have a pore size of a maximum not substantially exceeding 40 microns with 80 percent of the pores within the range between 6 and 28 microns and an average pore size of around 15 microns. The porosity or percentage of voids is 70 percent to give sheet 110 a solid content of around 30 percent. A thickness of sheet 110 of around $\frac{1}{16}$ inch and of a maximum not substantially exceeding $\frac{1}{8}$ inch has been found satisfactory for handling pulverulent materials, such as cement and plastic pellets.

Sheet 110 has pores arranged in a tortuous path through the sheet. Thus, the path of the gas passing through the permeable sheet is tortuous and any particles which fill the pores must follow the tortuous path. If the average pore size is around 15 microns, particles having a maximum dimension less than 15 microns may tend to enter the pores. The particles do not easily negotiate the bends or turns in a tortuous path and tend to collect at the first bend or turn which is usually closely adjacent the material supporting surface. Since the particles normally penetrate sheet 110 only to a minimum extent, the particles may be removed to a substantial extent by brushing of material supporting surface 112. Also, gas from plenum chamber 106 passing through sheet 110 tends to blow out the particles which have lodged in the pores.

Sheet 110 is nonabsorbent and has a relatively smooth and dense supporting surface 112 while being substantially rigid. This permits sheet 110 to be easily cleaned, such as, for example, by brushing, by water, or by a suitable solvent for the material being unloaded. For flour, a detergent such as soapy water may be satisfactorily employed for cleaning sheet 110.

Walls 44 and 46 have a relatively large unsupported dimension between U-shaped housing 52 and peripheral flange 28. The weight of the material to be unloaded, such as, for example, the lading within a railway hopper car is oftentimes relatively large and forms a substantial dead load on the walls during transit. At times, it is desirable for workmen to be supported on permeable walls 44 and 46 such as during a cleaning or repair operation. Therefore, walls 44 and 46 should be substantially rigid and an integral load carrying structural member for best results. To accomplish the foregoing, a rigid perforated plate or base 116 is secured to sheet 110 and is generally coextensive with sheet 110. Perforations 118 extend through plate 116 and comprise around 60 percent of the entire surface area of the plate. It is desirable to have as much of the surface area of plate 116 perforated as possible to permit increased diffusion of gas through sheet 110. Plate 116 may be formed of a high strength steel or other materials having sufficient strength for supporting sheet 110, such as a suitable plastic.

To secure sheet 110 and plate 116 to each other to form an integral structural load carrying member, sheet 110 and plate 116 should be secured along substantially their entire facing surfaces. Plate 116 has an upper surface or face 120 and a lower face 122 adjacent plenum chamber 106 as shown in FIGURE 9. A suitable adhesive 124 is first placed on face 120 and sheet 110 is then positioned on face 120. The area of surface 114 immediately above perforations 118 is substantially free of adhesive and does not obstruct the passage of gas through sheet 110. An adhesive which has been found to be satisfactory for bonding sheet 110 to plate 116 is adhesive EC–2214 produced by Minnesota Mining and Manufacturing Company, Adhesives, Coatings and Sealers Division, 900 Bush Avenue, St. Paul 6, Minnesota. Adhesive EC–2214 is a one hundred percent solids, thermosetting, liquid adhesives having high strength properties at service temperatures from —70° F. to 200° F. The adhesive has an epoxy resin base and may be applied by a knife coating, spatula, brush, or trowel, for example.

The permeability of a porous medium is a measure of the ease with which a fluid will pass through the medium, the higher the permeability, the higher the flow rate for a given pressure gradient. The flow rate is dependent on the fluid conductivities of all the flow channels in the medium and is effected by the variations and size, shape, direction, and interconnections of all the flow channels. The resistance to the passage of gas through the porous medium may be conveniently expressed in terms of gas volume passing at a specified pressure drop across the medium. As employed in the specification and claims herein, the term "permeability" is defined as "the amount of air measured in cubic feet and at 70° F. and 25 percent relative humidity which will pass through the area of one square foot of side walls 44 and 46 in one minute when tested under an equivalent pressure differential of 2 inches of water." A permeability of around ten (10) for walls 44 and 46 has been found to be satisfactory for handling finely-divided particles ranging in size between about 10 and 100 microns. This rating may be obtained by employing a metallic sheet 110 of around 1/16 inch in thickness having a solid content of around 30 percent, and a steel plate 116 of around 1/8 inch in thickness with apertures 118 including around 60 percent of the entire surface area of plate 116.

Air under pressure from an air source, such as compressor C, to plenum chamber 106 provides an air pressure of around 5 p.s.i. which is adequate to effect an air flow into a compacted mass of material supported on walls 44 and 46. A permeability of around ten (10) results in a substantially equal distribution of an apporpriate gas, such as air, throughout the length and width of plenum chamber 106 below walls 44 and 46 to assure passage of a generally uniform and controlled volume of air into the particles to be unloaded. For maximum results, surface 112 of walls 44 and 46 should be inclined at an angle which is in excess of the angle of repose of the fluidized material being handled.

Figure 10:
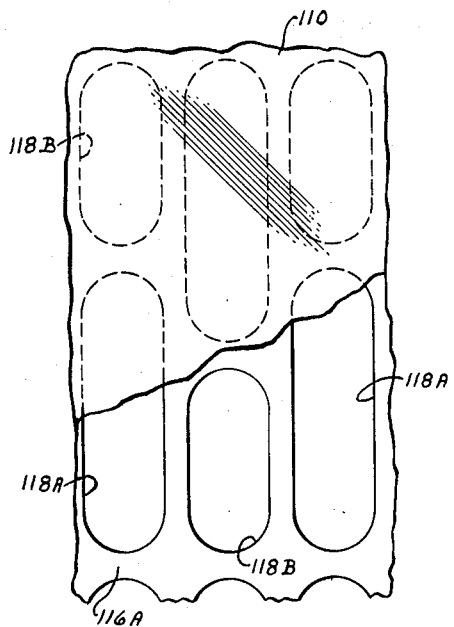
FIGURE 10 is a partial top plan similar to FIGURE 8 but illustrating a modified form of a permeable wall structure.

Referring to FIGURE 10, a modified form of a permeable wall is illustrated in which a supporting sheet 116A has elongate openings 118A and 118B therein. Permeable sheet 110 is identical to that shown in FIGURE 8. The slotted area formed by apertures 118A and 118B comprises about 60 percent of the surface area of sheet 116A. Sheet 110 and plate 116A are secured to each other in the same manner as the embodiment shown in FIGURES 8 and 9.

Operation is as follows:

Unloading from end G as indicated by the arrow in FIGURE 2, tube 54 is rotated counterclockwise in direction R1 until a sufficient slot area is exposed above lip 84 so that particles fall in valve 54 at a suitable rate depending on the material being unloaded and the pressure gradient. If pulverulent materials are being unloaded, air from plenum chamber 106 is diffused immediately adjacent U-shaped housing 52 and the material over tube 54 is fluidized. The introduction of gas or air in appropriate quantities into particles of suitable particle size ranges by diffusion results in a substantial change in properties and the gas-solid mixture will possess many of the properties of a fluid which permits the particles to be easily removed. Individual particles are separated from each other, a bulk volume considerably expanded, and the internal particle-to-particle friction reduced to a minimum. The fluidizing of pulverulent material permits the material to be unloaded in a minimum of time with only a small percentage of material moving by gravity and prevents caking or bridging over of the material, at least in the area where fluidizing of the material is occurring. Therefore, it is important that permeable walls 44 and 46 be provided immediately adjacent metering valve 54 so that the material which might tend to bridge across valve 54 is fluidized.

Figure 11:
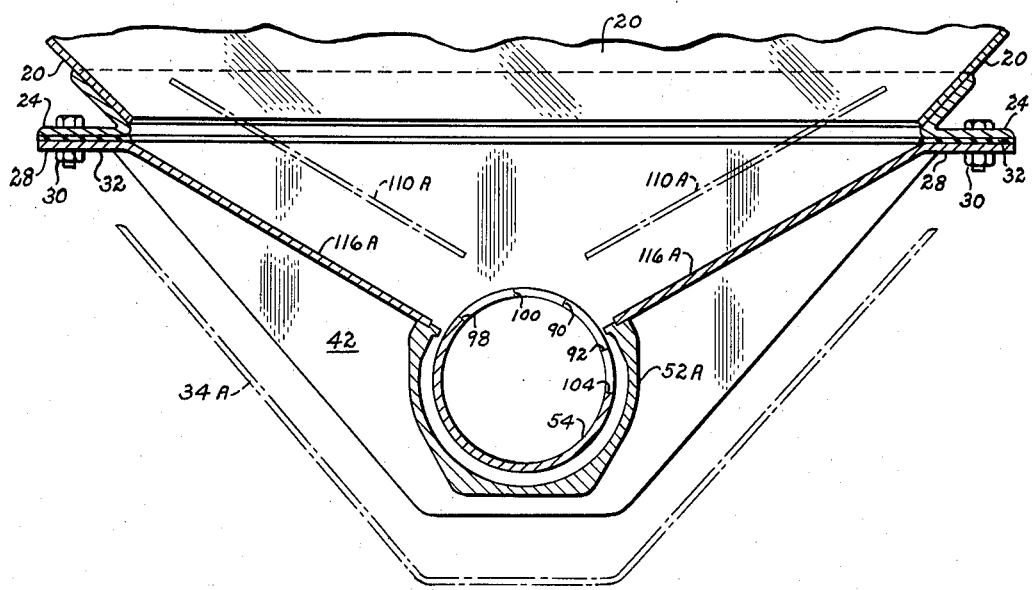
FIGURE 11 is a transverse section of an existing outlet structure for pneumatically unloading particles before the attachment of the present aerating means to assist in the pneumatic unloading of finely-divided particles, the attachment being indicated in broken lines.

When the material is removed over at least a portion of the length of metering valve 54, air is admitted directly within the valve and the pressure drops considerably. At this time it is necessary to move valve 54 to a first clean-out position as shown in FIGURES 2, 4 and 11. This clean-out position occurs when long notch 98 adjacent end H is opened slightly as shown in FIGURE 2. In this position since notch 98 adjacent end H is opened to a greater extent, a gravity flow of lading will be greater adjacent upstream end H than adjacent downstream end G. However, the pressure differential of downstream end G is greater than the pressure differential upstream at end H and compensates for the increased slot area at end H. With metering tube 54 in the position of FIGURE 2, substantially all the lading along side wall 46 is unloaded. Next, it is necessary to rotate tube 54 in an opposite direction so that the slotted area is exposed above lip 48 with any lading or material remaining on side wall 44 being removed. Lading adjacent side wall 44 is relatively small as the majority of the material has been previously removed. It is to be understood that during the unloading operation before the cleanout operation the slotted area may be opened to a lesser or greater than that shown in FIGURE 2.

It is desirable in some instances to provide existing pneumatic outlet structures having a metering valve 54 as shown in solid lines in FIGURE 11 with a plenum chamber adjacent tube 54 to assist in unloading from the outlet structure. For example, if bridging over tube 54 is occurring rather frequently in the unloading of a particular material, a plenum chamber adjacent tube 54 would be helpful. To modify the existing outlet structure which does not have a plenum chamber, openings are first formed in plates 116A similar to openings 118 illustrated in FIGURES 8 and 9. Next, sheets 110A are secured to plate 116A by a suitable adhesive. Outer housing 34A may then be secured, such as by welding, to peripheral flange 28 to form a plenum chamber having permeable walls immediately adjacent metering valve 54.

From the foregoing, the provision of a permeable wall immediately adjacent a metering valve or tube which receives material for pneumatic discharge aids in the unloading of the material from the tube and provides a uniform unloading of the particles. Any tendency of the material to bridge over the valve is eliminated by the permeable walls. Further, the valve is easily moved with a minimum of frictional contact as the fluidizing or aerating of the particles over the tube permits generally a fluid-like flow of particles into the tube for discharge, especially if the particles are pulverulent.

In view of the above, it may be seen that several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A covered hopper railway car having a hopper structure with surfaces funneling downwardly to a bottom opening, an outlet structure secured to the hopper structure beneath the bottom opening to receive finely-divided particles, said outlet structure comprising a pair of oppositely facing side walls sloping downwardly toward each other in a generally smooth relation and having spaced lower portions at least one of which terminates in a lip, a pair of end walls connecting the sloping side walls for forming a generally trough-shaped outlet structure, and a conduit structure extending between and below the spaced lower portions of said side walls to form a depressed trough bottom extending generally the length of the outlet structure in which the particles are removed pneumatically from the outlet structure, said conduit structure including an elongate metering tube between the spaced lower portions of the side walls and rotatable in one direction from a closed position to an open position for selectively discharging particles pneumatically from the outlet structure, said metering tube having a generally longitudinally extending slot to permit entry of particles from the outlet structure into the conduit structure when the slot is positioned between said spaced lower portions, said lip being closely spaced from the adjacent metering tube and extending longitudinally in a direction generally parallel to the rotational axis of the metering tube, said outlet structure being cut back immediately below said lip to define an increased clearance whereby a restriction is provided between the lip and adjacent metering tube, a portion of said slot being defined by a longitudinal edge disposed generally adjacent said lip during pneumatic unloading and extending for at least a substantial portion of the length of said lip, said longitudinal edge having a major portion thereof extending longitudinally at an angle to the longitudinal axis of said lip so that upon rotation of said metering tube to an open position in said one direction a progressively increasing portion of the longitudinal edge clears the lip to provide a progressively increasing slot area, the rotation of the metering tube in an opposite direction effecting a camming action against any particles at the restriction between said lip and said longitudinal edge thereby to minimize binding of the metering tube thereat, said side walls being fluid permeable at least adjacent the metering tube and having an upper particle supporting surface, means forming with the lower surface of the side walls a plenum chamber opposite the particle supporting surface, and means for introducing fluid within the plenum chamber whereby fluid passes from said plenum chamber through said side walls to aerate the particles adjacent the metering tube.

2. An outlet structure adapted to be secured beneath a hopper structure comprising a pair of oppositely facing side walls sloping downwardly toward each other in a generally smooth relation and having spaced lower portions, an open bowl-shaped housing extending downwardly between the spaced lower portions of said side walls to form a depressed trough bottom, a generally cylindrical metering tube disposed within said depressed trough and having a slot extending longitudinally thereof to receive particles from the outlet structure for pneumatic unloading, said housing forming a juncture with each of said lower portions each terminating in a lip spaced from the adjacent metering tube a distance not substantially exceeding ⅛ inch and forming a sealing edge generally parallel to the adjacent surface of the metering tube, said housing being cut back beneath each lip from the adjacent surface of the metering tube, means to rotate said tube about its longitudinal axis to position the slot in the area between the lower end portions of said sides thereby to permit particles to flow into the tube from the outlet structure for pneumatic unloading, said tube having a plurality of teeth defining at least one side of said slot and projecting generally at right angles to the longitudinal axis of the tube, each pair of adjacent teeth being separated by a notch extending generally at right angles to the longitudinal axis of the metering tube, said side walls being fluid permeable at least adjacent the metering tube and having an upper particle supporting surface, means forming with the lower surface of the side walls a plenum chamber opposite the particle supporting surface, and means for introducing fluid within the plenum chamber whereby fluid passes from said plenum chamber to said side walls to aerate the particles adjacent the metering tube for facilitating pneumatic discharge of the particles.

3. An outlet structure adapted to be secured beneath a hopper structure comprising a pair of oppositely facing side walls sloping downwardly toward each other in a generally smooth relation and having spaced lower portions each terminating in a lip, means connecting the side ends of the walls to form a generally trough-shaped outlet structure, a conduit structure extending between and below the spaced lower portions of the side walls to form a depressed trough bottom between the lips in which particles are removed pneumatically from the outlet structure, said conduit structure including an elongate metering tube between the spaced lower portions of the side walls and rotatable in one direction from a closed position to an open position, said metering tube having a slot extending longitudinally thereof to receive particles from the outlet structure for pneumatic unloading when positioned between the lips, each of said lips being closely spaced from the adjacent metering tube and extending longitudinally in a direction generally parallel to the rotational axis of the metering tube, said conduit structure being cut back immediately below each lip to define an increased clearance whereby a restriction is provided between each lip and the adjacent metering tube, said slot being defined by a pair of facing longitudinal edges each having a major portion thereof extending longitudinally at an angle to the longitudinal axes of said lips so that upon rotation of said metering tube in one direction to an open position a progressively increasing portion of one longitudinal edge clears the adjacent lip to provide a progressively increasing slot area, the rotation of the metering tube in an opposite direction effecting a camming action against any particles at the restriction between said one longitudinal edge and said adjacent lip thereby to minimize binding of the metering tube thereat, said side walls being fluid permeable at least adjacent the metering tube and having an upper particle supporting surface, means forming with the lower surface of the side walls a plenum chamber opposite the particle supporting surface, and means for introducing fluid within the plenum chamber whereby fluid passes from the plenum chamber through the side walls to aerate the particles adjacent the metering tube.

4. An outlet structure as set forth in claim 3 wherein said each longitudinal edge comprises a plurality of projecting teeth spaced therealong longitudinally of the elongate metering member, each pair of adjacent teeth being separated by a notch extending generally at right angles to the longitudinal axis of the metering tube.

5. An outlet structure as set forth in claim 4 wherein the teeth project progressively farther in a direction transversely of the metering tube from one end of the metering tube to the other end thereof.

6. An outlet structure adapted to be secured beneath a hopper structure comprising a pair of oppositely facing side walls sloping downwardly toward each other in a generally smooth relation and having spaced lower portions each terminating in a lip, means connecting the ends of the side walls to form a generally trough-shaped outlet structure, a conduit structure extending between and below the spaced lower portions of the side walls to form a depressed trough bottom between the lips in which particles are removed pneumatically from the outlet structure, said conduit structure including an elongate metering tube between the spaced lower portions exceeding ⅛ inch, said permeable sheet having tortuous of the side walls and rotatable in one direction from a closed position to an open position, said metering tube having a slot extending longitudinally thereof to receive particles from the outlet structure for pneumatic unloading when positioned between the lips, each of said lips being closely spaced from the adjacent metering tube and extending longitudinally in a direction generally parallel to the rotational axis of the metering tube, said conduit structure being cut back immediately below each lip to define an increased clearance whereby a restriction is provided between each lip and the adjacent metering tube, means forming with at least a portion of the lower surfaces of said sides a plenum chamber, and means for introducing fluid within the plenum chamber, each of said side walls comprising a permeable sheet having spaced parallel faces with one of the faces forming a particle supporting surface and a perforated substantial rigid plate generally coextensive with and adjacent the other of said faces of the sheet, the thickness of the plate relative to its planar dimension being great enough to support particles without substantial deflection, said plate and said sheet being secured to each other along substantially their entire facing surfaces to form an integrally bonded rigid sandwich, said permeable sheet having a relatively hard and smooth particle supporting surface thereby to permit the particles to move easily along the surface and the surface to be easily cleaned.

7. An outlet structure as set forth in claim 6 wherein the void space in said permeable sheet exceeding around 50 percent of the total volume of the sheet, the void space being generally uniform throughout the entire volume of the permeable sheet to permit a generally uniform passage of fluid through the permeable sheet from the plenum chamber, the permeable sheet having tortuous flow passages forming the voids to minimize clogging thereof.

8. An outlet structure adapted to be secured beneath a hopper structure comprising a pair of oppositely facing side walls sloping downwardly toward each other in a generally smooth relation and having spaced lower portions each terminating in a lip, means connecting the side walls to form a generally trough-shaped outlet structure, a conduit structure extending between and below the spaced lower portions of the side walls to form a depressed trough bottom between the lips in which particles are removed pneumatically from the outlet structure, said conduit structure including an elongate metering member between the spaced lower portions of the side walls and rotatable in one direction from a closed position to an open position, said metering tube having a slot extending longitudinally thereof to receive particles from the outlet structure for pneumatic unloading when positioned between the lips, each of said lips being closely spaced from the adjacent metering tube and extending longitudinally in a direction generally parallel to the rotational axis of the metering tube, said conduit structure being cut back immediately below each lip to define an increased clearance whereby a restriction is provided between each lip and the adjacent metering tube, said side walls being fluid permeable at least adjacent the metering valve and having upper particle supporting surfaces, means forming with the lower surface of the side walls a plenum chamber opposite the particle supporting surfaces, means for introducing fluid within the plenum chamber, said fluid permeable side walls each comprising a permeable sheet having two spaced parallel faces with one of the faces forming the particle supporting surface and a perforated substantially rigid plate coextensive with and adjacent the other of said faces of the sheet, the thickness of the plate relative to its planar dimension being great enough to support the particles without substantial deflection, said plate and said sheet being secured to each other along substantially their entire facing surfaces to form an integrally bonded rigid sandwich, said permeable sheet having a void space measured as a ratio between the volume of voids and the total volume of the sheet of at least 50 percent, a substantial majority of the void space being below around 40 microns, said permeable sheet comprising a plurality of interlocked metal fibers bonded at interfiber contact points and having a length to diameter ratio of at least 10 to 1, the fibers being randomly dispersed and compressed to a thickness not substantially exceeding ⅛ inch, said permeable sheet having tortuous flow passages formed by the void space to minimize clogging of the flow passages and having a smooth particle supporting surface to permit the particles to move easily along the surface.

References Cited by the Examiner

UNITED STATES PATENTS

| | | | |
|---|---|---|---|
| 2,310,620 | 2/1943 | Dye | 222—486 X |
| 2,650,726 | 9/1953 | Aller et al. | 214—83.28 |
| 3,017,698 | 1/1962 | Hambrecht et al. | 55—526 X |
| 3,127,668 | 4/1964 | Troy | 29—182 |
| 3,127,851 | 4/1964 | Auksel | 105—248 |

LOUIS J. DEMBO, *Primary Examiner.*